US010803010B2

(12) United States Patent
Trulli, Jr. et al.

(10) Patent No.: US 10,803,010 B2
(45) Date of Patent: Oct. 13, 2020

(54) MESSAGE AFFINITY IN GEOGRAPHICALLY DISPERSED DISASTER RESTART SYSTEMS

(71) Applicant: EMC IP HOLDING COMPANY LLC, Hopkinton, MA (US)

(72) Inventors: Dennis J. Trulli, Jr., Littleton, MA (US); Peter Callewaert, Sint-Amands (BE); Kenneth J. Schopp, West Bend, WI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 15/971,776

(22) Filed: May 4, 2018

(65) Prior Publication Data

US 2019/0340043 A1    Nov. 7, 2019

(51) Int. Cl.
| | |
|---|---|
| *G06F 16/11* | (2019.01) |
| *G06F 9/48* | (2006.01) |
| *G06F 9/54* | (2006.01) |
| *G06F 11/14* | (2006.01) |

(52) U.S. Cl.
CPC ............ *G06F 16/11* (2019.01); *G06F 9/4881* (2013.01); *G06F 9/546* (2013.01); *G06F 11/1469* (2013.01); *G06F 16/119* (2019.01); *G06F 16/122* (2019.01)

(58) Field of Classification Search
CPC .... G06F 9/546; G06F 9/4881; G06F 2201/84; G06F 11/1469; G06F 16/11; G06F 16/119; G06F 16/122; G05F 11/1469

USPC ......................................................... 707/654
See application file for complete search history.

(56) References Cited

U.S. PATENT DOCUMENTS

| | | | | |
|---|---|---|---|---|
| 6,970,987 | B1* | 11/2005 | Ji | ........................ G06F 11/1076 711/162 |
| 9,959,049 | B1* | 5/2018 | Armangau | ............ G06F 3/0608 |
| 10,409,687 | B1* | 9/2019 | Bono | ....................... G06F 16/11 |
| 2010/0083052 | A1* | 4/2010 | Huber | ................. G06F 11/0709 714/45 |
| 2015/0163179 | A1* | 6/2015 | Maes | ...................... G06F 9/546 709/206 |

* cited by examiner

*Primary Examiner* — Grace Park
*Assistant Examiner* — Jessica N Le
(74) *Attorney, Agent, or Firm* — Krishnendu Gupta; Anne-Marie Dinius

(57) ABSTRACT

The system, products, and methods disclosed herein relate to an improved configuration for geographically dispersed data restart ("GDDR") systems. Specifically, the teachings herein ensure a particular GDDR instance does not react to messages issued from address spaces outside of its affinity group. We use the term message "affinity group" to mean the combination of a particular GDDR instance and its set of Mainframe Enablers started tasks. By ensuring that the particular GDDR instance does not react to messages intended for recipients outside of its affinity group, we improve computer functionality and efficiency by facilitating further partitioning of the logical partition. Once the logical partition is further partitioned into additional address spaces, it is possible to run Mainframe Enablers and/or additional GDDR instances independent of the particular GDDR instance of concern.

20 Claims, 6 Drawing Sheets

MESSAGE AFFINITY IN GEOGRAPHICALLY DISPERSED DISASTER RESTART SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates to geographically dispersed disaster restart ("GDDR") data storage systems, and, more particularly, to systems and methods for ensuring a GDDR instance coexisting on a logical partition with other mainframe enabler tasks or other GDDR C-system instances does not react to messages sent to or from address spaces outside of its affinity group.

BACKGROUND

Computer data is vital to today's organizations, and a significant part of protection against disasters is focused on data protection. As solid-state memory has advanced to the point where the cost of memory has become a relatively insignificant factor, organizations can afford to operate with systems that store and process terabytes of data. Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

One of the main goals of data replication is the provision of business resiliency, which generally means the ability for a business to protect employees, assets, and reputation before, during and after an adverse event. One of the most valuable assets that must be protected is data stored within networks. For many businesses, it is critical to have accurate and up-to-date data stored within its network. Using an obvious example, a bank must ensure that its electronic record keeping of daily transactions is both accurate and up-to-the-minute. Deposits, transfers, debits, credits, reconciliations from one bank to another, account closures, and the like must all be accurate and current. The potential for great financial loss, as well as legal liability is at stake.

Financial institutions are not the only businesses requiring business resiliency. Indeed, most modern-day businesses must create and execute plans aimed at achieving and improving business resiliency. Against this backdrop, Dell EMC developed a data recovery architecture it calls Geographically Dispersed Disaster Restart ("GDDR"). GDDR is a mainframe-based software automation package Dell EMC has used to provide equipment and environmental monitoring, alerting and automated restart and recovery in IBM z/OS mainframe multisite environments where EMC Symmetrix (VMAX) Direct Access Storage Devices (DASD) are in use. GDDR Tape provides similar monitoring, alerting and restart capabilities to multisite IBM z/OS environments where Disk Library for mainframe (DLm) has been implemented.

GDDR and GDDR Tape can be implemented separately or together to aid, enhance and provide Geographically Dispersed Disaster Recovery for multisite z/OS environments using both VMAX DASD and DLm storage systems. GDDR software is IBM mainframe-based software. GDDR provides two distinct capabilities. First, GDDR provides continuous monitoring of the storage and environment. When a disruption or failure is detected, GDDR will automatically provide alerting to the mainframe operations staff that a disruption or failure has been detected. Second, GDDR provides Disaster Recovery (DR) automation services. These services are provided via a collection of scripts that can be run on the mainframe to take specific actions and provides automation for both planned and unplanned events Dell EMC offers a unique data consistency solution for customers using both VMAX as their primary mainframe DASD and DLm with VMAX back-end storage for their virtual tape library. Dell EMC Mainframe-Enabler software includes Consistency Group ("ConGroup") and Multi-Session Consistency ("MSC") software packages that run on an IBM z/OS mainframe to provide point in time data consistency across centralized knowledge devices and/or logical unit numbers ("LUN") being replicated using Symmetrix Remote Data Facility (SRDF). ConGroup provides data consistency for synchronous replication links (SRDF/S) while MSC provides data consistency for asynchronous replication links (SRDF/A).

Using the full GDDR product, two-site, three-site, referred to as STAR, and four-site, referred to as a SQAR, VMAX SRDF configurations can guarantee that devices/LUNs defined in a single consistency group will be maintained in a single point in time, ensuring that restart at a data recovery site can always be performed. For more information on Dell EMC's GDDR, see http://ourdigitalmags.com/publication/?i=448175&article_id=2918444&view=articleBrowser&ver=html5#{"issue_id":448175,"numpages":1,"view":"articleBrowser","article_id":"2918444"}, the entire contents of which are hereby incorporated by reference.

Although GDDR systems provide data redundancy, they require a dedicated logical partition for each control-system instance running within the system. A logical partition ("LPAR") is the division of a computer processor's memory and storage into multiple sets of resources so that each set of resources can be operated independently with its own operating system instance and applications. An LPAR is also sometimes referred to as a mainframe, or a z/OS system throughout this specification. The number of logical partitions that can be created depends on the system's processor model and available resources. Typically, partitions are used for different purposes such as database operation, client/server operation, or to separate test and production environments.

With the existing GDDR solution, customers must have a dedicated mainframe LPAR for each GDDR C-system instance. This results in additional hardware costs for each additional GDDR-managed storage configuration. In order to reduce the number of mainframes, and therefore the total cost, required for a GDDR system, it is desirable to allow multiple GDDR complexes, defined below, managing different storage configurations to share the same set of control systems. A significant challenge in realizing this configuration is ensuring the autonomy of the various GDDR multi-tenancy system embodiments. This is particularly challenging from a messaging standpoint. On any given mainframe having multiple GDDR instances coexisting, there will be myriad messages being exchanged among the various components of the systems. In this environment, it is challenging to ensure that messages pertaining to a particular GDDR complex are received and reacted to within that complex. As a corollary, it is equally important, that a particular GDDR complex does not react to messages intended for another GDDR complex coexisting on the same mainframe LPAR.

This same scenario arises when there is a GDDR instance running on a mainframe wherein the mainframe also has Mainframe Enabler tasks or other tasks not associated with the GDDR instance's affinity group. There is thus a need for a method, system, and product that facilitates affinity-based communication between GDDR complexes and other address spaces coexisting on a single mainframe LPAR.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The system, products, and methods disclosed herein relate to an improved configuration for geographically dispersed data restart ("GDDR") systems. Specifically, the teachings herein ensure a particular GDDR instance does not react to messages issued from address spaces outside of its affinity group. We use the term message "affinity group" to mean the combination of a particular GDDR instance and its set of mainframe enabler started tasks. By ensuring that the particular GDDR instance does not react to messages originating outside of its affinity group, we improve computer functionality and efficiency by making it possible to run mainframe enablers and/or additional GDDR instances independent of the particular GDDR instance of concern sharing the same logical partition resources.

In one embodiment, we disclose a method for enabling a geographically dispersed disaster recovery ("GDDR") control system or a managed production system having a subsystem connector associated therewith and being a part of an affinity group to coexist on a mainframe, the mainframe having a Mainframe Enablers address space outside of the affinity group comprising the steps of: (a) receiving within a GDDRMAIN address space a message from the Mainframe Enabler address space, the message comprising a message identifier and a plurality of message characteristics; (b) evaluating the message identifier to determine if a message affinity analysis should be performed; (c) scheduling a service request block to run in an address space from which the message was sent; (d) verifying the address space from which the message was sent; (e) determining a subsystem connector associated with the address space from which the message was sent; and (f) comparing the subsystem connector associated with the address space from which the message was sent to the subsystem connector for the GDDRMAIN address space.

In another embodiment, we disclose a computer program product for enabling a geographically dispersed disaster recovery ("GDDR") control system or a managed production system having a subsystem connector associated therewith and being a part of an affinity group to coexist on a mainframe, the mainframe having a Mainframe Enablers address space outside of the affinity group, the computer program product being embodied in a tangible, non-transitory computer readable storage medium and comprising computer instructions for: (a) receiving within a GDDRMAIN address space a message from the Mainframe Enabler address space, the message comprising a message identifier and a plurality of message characteristics; (b) evaluating the message identifier to determine if a message affinity analysis should be performed; (c) scheduling a service request block to run in an address space from which the message was sent; (d) verifying the address space from which the message was sent; (e) determining a subsystem connector associated with the address space from which the message was sent; and (1) comparing the subsystem connector associated with the address space from which the message was sent to the subsystem connector for the GDDRMAIN address space.

In yet an alternate embodiment, we disclose a system having a memory partitioned into a plurality of address spaces, the system enabling a geographically dispersed disaster recovery ("GDDR") control system having a subsystem connector associated therewith and being a part of an affinity group to coexist on a mainframe, the mainframe having a Mainframe Enablers address space outside of the affinity group comprising computer executable code for performing the steps of: (a) receiving within a GDDRMAIN address space a message from the Mainframe Enabler address space, the message comprising a message identifier and a plurality of message characteristics; (b) evaluating the message identifier to determine if a message affinity analysis should be performed; (c) scheduling a service request block to run in an address space from which the message was sent; (d) verifying the address space from which the message was sent; (e) determining a subsystem connector associated with the address space from which the message was sent; and (f) comparing the subsystem connector associated with the address space from which the message was sent to the subsystem connector for the GDDRMAIN address space.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

GLOSSARY OF TERMS

Figure 1:
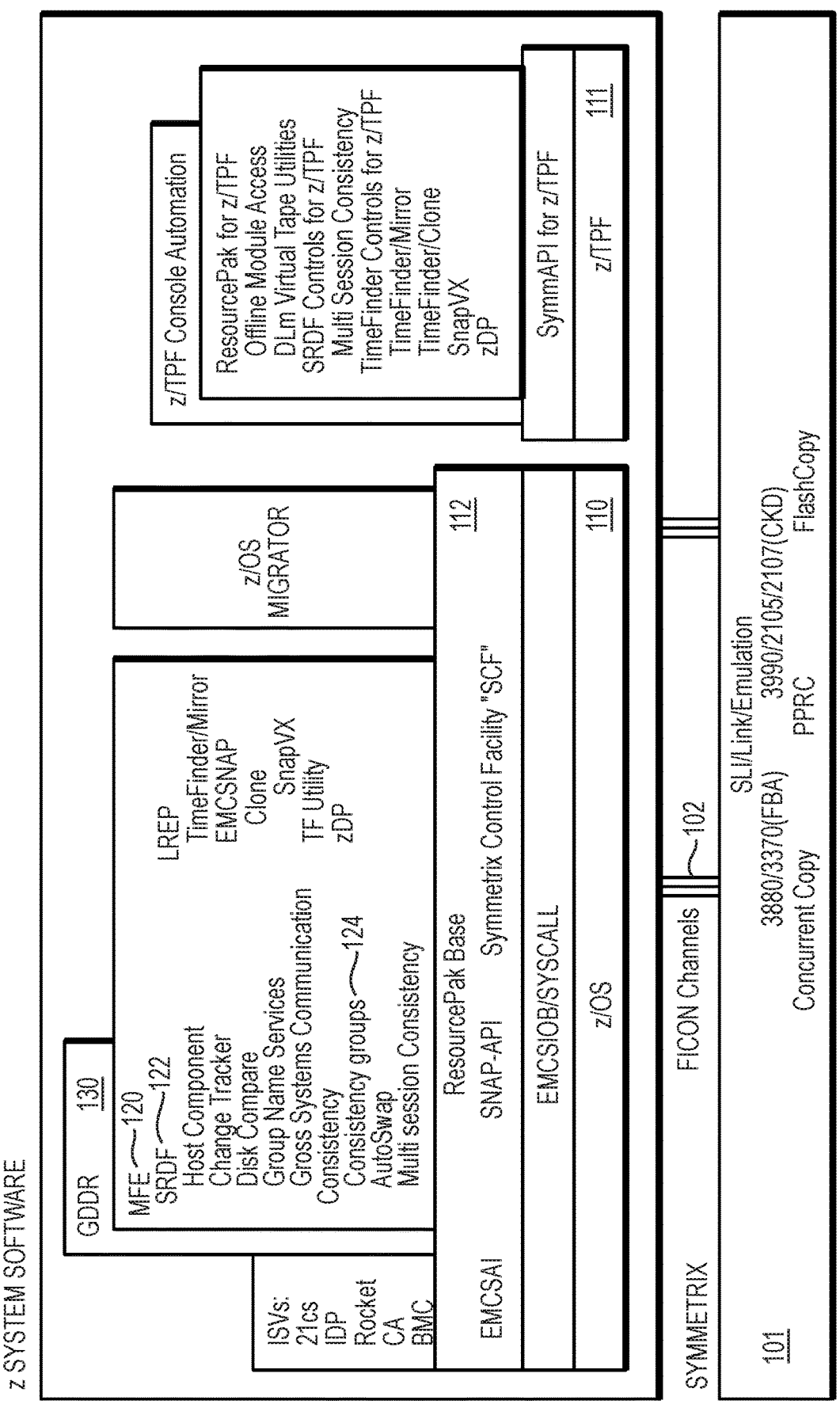
FIG. 1 is a software stack diagram showing integration points between Dell EMC mainframe software for z/OS and z/TPF operating systems.

The following terms have the following meanings as used within the specification and claims.

Affinity group refers to the combination of a GDDR-instance and its set of dedicated mainframe enabler ("MFE") started tasks (e.g., SCF, SRDF Host Component, Con-Group).

C-instance refers to a GDDR-instance performing the task of the GDDR C-system function.

Consistency group ("Con-group") refers to Dell EMC MFE software protecting data-consistency in a single GDDR complex, over a synchronous connection.

GDDR complex means a set of C-instances (one per site), and their managed production systems ("P-systems"), connected in some embodiments via TCP/IP, managing a single storage configuration.

GDDR connector means DD (data definition) whose name is in the format GDD$xxxx, where xxxx is the GDDR subsystem name. A GDDR connector is what ties GDDR address spaces together. The presence of this DD in the JCL connects a particular address space to the named GDDR instance.

GDDR-instance refers to the combination of a single GDDRMAIN address space and its dependent address spaces (e.g., GDDREVM, GDDRWORK, GDDR scripts) running on a given z/OS, also called an LPAR.

Mainframe enablers ("MFE") means a suite of DELL EMC Mainframe software including ResourcePak Base (aka Symmetrix Control Facility or SCF), and SRDF Host Component, with optional components such as ConGroup, Auto-Swap, MSC, TimeFinder and zDP Message affinity means the mechanism that keeps different GDDR-complexes fully isolated from each other and prevents a GDDR-instance from reacting to messages that do not belong to it, either by processing them locally or by forwarding them to another system in the GDDR-complex. Message affinity also prevents a GDDR-instance from reacting to messages issued by any MFE started tasks running outside of a GDDR-managed configuration.

[xxxx] Multi-session Consistency (MSC) refers to Dell EMC MFE software protecting data-consistency in a single GDDR complex, over an asynchronous connection.

P-system is an abbreviation for "production system." It means a z/OS system which is defined to GDDR to be a "GDDR-managed system" so that the C-systems can take planned and unplanned restart and recovery actions against that system. A p-system runs at a GDDR site, and is managed by the GDDR C-systems in the same GDDR complex. It drives IO requests to the storage systems managed by the GDDR C-systems. DELL EMC recommends having a GDDR presence (i.e., GDDRMAIN and dependent subtasks) on P-systems.

Symmetrix control facility (SCF") connector means DD (data definition) whose name is in the format SCF$xxxx, where xxxx is the SCF subsystem name. An SCF connector is what ties Dell EMC mainframe address spaces together. The presence of this DD in the JCL connects a particular address space to the named SCF instance.

DETAILED DESCRIPTION

In the data protection/data recovery field, there are many products designed to provide redundant data storage designed for business resiliency. One such solution, Dell EMC's Geographically Dispersed Disaster Restart ("GDDR") architecture, is an illustrative platform for discussing embodiments of the present system and methods designed to enhance the performance of data redundancy systems by ensuring that GDDR systems do not react to messages intended for another entity, such as a second GDDR system or an set of mainframe enabler tasks or the like running on a shared logical partition.

We use the term "message affinity" to indicate that a message is intended for a particular GDDR instance. For example, if a GDDR instance was identified as GDD1, it would have message affinity with messages issued by address spaces running within the GDD1 instance. Ideally, GDD1 would not react to messages sent from or to other GDDR instances. These concepts will be explained more fully below. Those of skill in the art will recognize the applicability of the teachings discussed herein to other architectural data redundancy platforms.

FIG. 1 shows a mainframe software stack diagram depicting integration points between DELL ELMC Mainframe Software for the z/OS and z/TPF operating systems. The software stack covers both the base API layer, as well as the higher-level software offerings. Each of these elements is discussed below, starting with the Enginuity Core Services at the bottom of FIG. 1.

Hardware and Enginuity

Enginuity Core Services—This layer provides all DELL EMC Symmetrix VMAX feature functionality, like FAST, SRP(s), SRDF, LREP (including SnapVX), ECA, Host Communication Scratch Area.

SLI/Link/Emulation 101—This layer provides device and control unit type emulation for mainframe "MF" hosts, as well as emulation for IBM software features such as Concurrent Copy, PPRC (IBM's remote replication solution) and Flashcopy (IBM's LREP solution).

FICON Channels 102—these are essential both for the MF Host to be able to perform basic IO operations to Symmetrix, as well for carrying the various syscalls from management software.

Above the Ficon Channels element, the diagram bifurcates into a z/OS 110 and a z/TPF 111 path, each path is discussed below.

z/OS z/OS—The z/OS 110 operating system is the current evolution of IBMs MVS operating system, which has been around for decades. The z/OS 110 operating system allows definition of an I/O configuration both at the MF Hardware level and the operating system software level so that the control units and devices presented by Symmetrix VMAX become addressable by application programs running on top of z/OS 110. At the software level, individual Symmetrix devices become available as an MVS-address a/k/a "subchannels." MVS-addresses are 5-digit hex numbers, consisting of a 4-digit device number prefixed by a sub-channel-set indicator. MVS-addresses can be varied ONLINE or OFFLINE to the host using an MVS-command. OFFLINE devices are not available for regular IO, but still allow syscall IO. DELL EMC Gatekeepers in the Mainframe world are represented by an OFFLINE MVS-address. With the exception of the Starfire GK which is must be ONLINE. Mainframe IO is performed through the creation of a Channel Program, which is a series of one or more Channel Command Words (CCW) executed using a STARTIO (low-level) or Execute Channel Program (EXCP, higher level) instruction.

EMCSIOB/SYSCALL—The SYSCALL layer is implemented by attaching a syscall specific payload to one of a few special CCWs (e.g. Perform Subsystem Function and Define Special Operation).

ResourcePak Base—ResourcePak Base software provides the MF Management Software foundation layers to all applications that interact with Symmetrix. It also provides Licensed Feature Control which is used by GDDR. FIG. 1 shows Symmetrix Control Facility (SCF) 112 as the heart of the ResourcePak Base software. SCF 112 runs as a persistent address space and subsystem on z/OS 110 hosts. It provides a uniform interface for EMC and ISV software products, where all products are using the same interface at the same feature/function level. ResourcePak Base is the delivery mechanism for the EMC Symmetrix Applications Programming Interface for z/OS (SymmAPI-MF), as well as the SNAP-API and Swap Services. It provides a central point of control by giving software a persistent address space on the mainframe for VMAX functions, performing tasks such as the following:

Maintaining an active repository of information about VMAX devices attached to z/OS 110 environments and making that information available to other EMC or ISV-provided products;

Performing automation functions;

Facilitating inter-LPAR communication through the VMAX storage system. (The Cross Systems Communication feature shown higher-up in the diagram is an SCF 112 function);

Facilitating inter-program communication through a persistent address space on the host; and Insulating host applications from differences in the Enginuity/HYPERMAX OS operating environment of the VMAX system at different release levels.

ISVs—ISVs are shown top-right in the diagram, and use the documented EMCSAI interface for development of their MF Management software packages.

z/OS Migrator—DELL EMC z/OS Migrator is a host-based data migration facility that migrates data from any vendor's storage array to a VMAX system without application downtime or disruption to business-continuity readiness. It can also be used to migrate data from one VMAX system to another. The migration can be done at either the volume or the dataset level. EMC z/OS Migrator performs traditional volume migrations as well as host-based volume mirroring. Together, these capabilities are referred to as the Volume Mirror and Volume Migrator functions of z/OS Migrator. In addition, z/OS Migrator can also migrate active mainframe datasets at the logical dataset (extent) level from one set of volumes to another, without any application downtime. This capability is referred to as logical migration, and z/OS Migrator can perform this migration in a non-disruptive manner to applications and business continuity.

MFE 120—The Mainframe Enablers 120 suite of software products sits squarely in the middle of FIG. 1. The Mainframe Enablers 120 suite of software, discussed in three parts below, is one integrated software suite.

MFE Part 1—SRDF 122 Related Infrastructure and Support Software

SRDF HC—SRDF Host Component is supporting tool used to Query and Manage an SRDF configuration. It provides a wide array of query types, showing detailed device-type and device-attribute information, as well as rdf-group level and Symmetrix level information. It allows the user to control synchronous, asynchronous and ADCOPY-DISK remote replication, with extensive command validation, both from the syntax and the object status perspective. SRDF HC also plays an important role in the definition of Multi-Session-Consistency (MSC) groups.

ChangeTracker—The ChangeTracker utility allows users to monitor activity on VMAX devices. ChangeTracker enables determination of the number of tracks that have been accessed during the interval since the last monitoring. Having accurate track change information is important when sizing SRDF connectivity requirements. Users typically must know the speed and number of connections required from service providers for an effective SRDF implementation. ChangeTracker helps determine this important information. Having accurate track change information is also important in determining resynchronization times. Users can track changes to help set the time needed for various synchronizing and resynchronizing activities.

ChangeTracker consists of two components, namely, ChangeTracker Collector, which gathers statistics, and ChangeTracker Reporter, which analyzes the data and formats it into useful reports. In addition, ChangeTracker Reporter can assist in configuring SRDF environment by calculating one of the three calculated parameters: (1) number of remote adapters, (2) communication speed, and (3) resynchronization time, based on the values of the other two parameters.

Disk Compare—The Disk Compare utility compares tracks on pairs of logical disk volumes at the physical level. The utility supports comparison of devices that are multiple hops away in an SRDF configuration. When using Disk Compare, users can compare multiple devices at the same time. In addition, they can analyze all tracks up to 32 pairs of logical disk volumes at the same time. Moreover, users can refine the scope of comparison by specifying the number of cylinders desired for comparison, including the cylinder skip count.

Disk Compare reports all miss-compares and errors on a pair of volumes until it has detected a preset number of miss-compared tracks. At that point, Disk Compare terminates. If users are comparing multiple pairs of devices, and any device pair fails, the remaining device pairs continue to be processed. Disk Compare is able to perform remote comparisons in SRDF configurations that include two or three VMAX systems, which allows users to verify the data integrity of the primary (R1) and secondary (R2) device.

Cross Systems Communication (CSC)—CSC is provided through ResourcePak Base and controls inter-LPAR communications. CSC uses locally and remotely connected VMAX systems to facilitate communications between LPARs, across sysplex boundaries. A number of EMC VMAX mainframe applications (e.g. ConGroup, AutoSwap) use CSC to handle inter-LPAR communications.

Group Name Services—GNS (Group Name Services) is the VMAX group definition sharing facility. GNS allows users to define a group once, in one place, and then use that single definition across multiple Dell EMC products on multiple platforms. Users can use group definitions created through GNS on a mainframe system with Dell EMC software products running on open systems hosts. GNS also allows users to define group names for volumes that can then be operated upon by various other commands. Each group is a collection of VMAX system and the devices that reside on those systems. For groups that span multiple systems, the definition is stored as a set of components on different VMAX systems, each of which holds its portion of the definition. GNS groups on the Mainframe are manipulated using SCF commands or using a batch utility.

MFE Part 2—SRDF Consistency Management Software 124

Consistency Groups (CG)—EMC Consistency Groups (ConGroup) is designed to protect and maintain consistency of remotely mirrored data in an SRDF/S configuration. ConGroup supports all valid SRDF topologies, including Concurrent and Switched SRDF.

ConGroup relies on the host application to implement dependent write logic. Dependent write logic means that an attempt by an application to issue a given I/O request depends on the prior successful completion of another I/O operation. ConGroup further relies on the Symmetrix SRDF-ECA feature to prevent write completion in case the update cannot be propagated to the R2. The event whereby a Write IO fails to replicate to the R2, and the subsequent suspension of all synchronous SRDF replication for devices included in the protected group, is called a ConGroup Trip. ConGroup thus ensures a consistent restartable image of the data exists on the synchronous R2 target devices.

ConGroup uses the Cross System Communication (CSC) component of ResourcePak Base to coordinate ConGroup state changes across multiple z/OS images in a shared DASD or parallel sysplex environment, in what is called a CSC Multi-mode network. Because ConGroup uses SCF, the ConGroup multi-mode network can span multiple LPARs, within or outside parallel sysplexes, multiplexes, or combinations of these.

AutoSwap a/k/a ConGroup AutoSwap Extension (CAX)—AutoSwap can move (swap) workloads from volumes in one set of VMAX systems to volumes in other VMAX systems without interruption of operations. Swaps can be initiated manually as planned events or automatically as unplanned events upon failure detection. AutoSwap can be used in both shared and non-shared DASD environments. AutoSwap uses standard z/OS operating system services to ensure serialization and to affect swaps. AutoSwap uses the Cross System Communication (CSC) component of ResourcePak Base to coordinate swaps across multiple z/OS images in a shared DASD or parallel sysplex environment. Because AutoSwap uses SCF, the AutoSwap consistency environment can span multiple LPARs, within or outside parallel sysplexes, multiplexes, or combinations of these. AutoSwap is tightly integrated with ConGroup, so that a ConGroup Trip will preclude any subsequent Swap, and a Swap disables ConGroup.

Multi-Session Consistency (MSC)—MSC (Multi-Session Consistency) is an environment in SCF that ensures remote R2 consistency across multiple VMAX systems running SRDF/A. It provides coordination of SRDF/A cycle switches across systems. SRDF/A sessions can be grouped together as a single entity called an MSC group. The MSC group is defined through SRDF Host Component. A system running MSC software is referred to as an MSC server. MSC can be configured with a Primary MSC Server and one or more Secondary MSC Servers. Secondary MSC servers can automatically take on the SRDF/A cycle switch co-ordination should the Primary MSC server fail. MSC can be active in a 2-Site configuration controlling just the SRDF/A cycle switching, or it can be part of a larger configuration as discussed below SRDF/Star—In an SRDF/Star configuration, which consists of SRDF/S replication for one pair of sites, Concurrent or Cascaded with asynchronous replication to a third site, MSC software is integrated with ConGroup (and optionally AutoSwap software) and performs not only the SRDF/A cycle switch coordination, but also the SDDF session management required to provide the differential resynchronization between the recovery sites should the source site (or in the Cascaded case, the synchronous target site) be lost. In case replication on the synchronous connection is interrupted, MSC will export an indication that the long distance remote site has the most recent data. SRDF/Star can be configured with a Primary MSC Server and a Secondary MSC Server. An MSC,TAKEOVER command is provided to allow a Secondary MSC server to take over not only the SRDF/A cycle switch co-ordination, but also the integration with ConGroup and the SDDF session Management. SRDF/Star is supported with GDDR.

SRDF/SQAR—the SRDF/SQAR configuration provides consistent replication on the edges of a square (4-site) configuration. The 4 sites in this configuration are grouped with 2 sites at short distance from each other, located in 2 regions at long distance from each other. In this configuration, MSC controls 2 independent MSC groups, one on each long distance connection, and is integrated with AutoSwap software on the short distance connection. MSC again provides SRDF/A cycle switch co-ordination, and SDDF session management at the recovery sites in the remote region. In embodiments, SRDF/SQAR is configured with a Primary and a Secondary MSC Server, providing similar functionality as described for SRDF/Star. In alternate embodiments, SRDF/SQAR is supported with GDDR.

SRDF/Star-A—The SRDF/Star-A configuration is comprised of 3 sites, all at long distance from each other, with Concurrent SRDF/A from one source site to two target sites, and differential resynchronization between the two target sites, should the source site be lost. In this configuration MSC again controls SRDF/A cycle switching for two independent MSC groups, one for each long distance connection from the source site, and performs SDDF session management at the target sites.

MFE Part 3—TimeFinder Related Software (LREP)

TF/Mirror—full space volume copies—In the past, TF/Mirror target devices acted as a true local mirror of the source device. Since the introduction of VMAX, all TF/Mirror commands, although still syntactically supported, are converted by the EMCTF program to TF/Clone commands. TF/Mirror supports differential operations after an initial full copy has been performed. TF/Mirror has ESTABLISH/RESTORE to cause the copying of the data, and SPLIT commands to stop the data copy and allow the target devices to be made accessible to the host.

TF/Mirror supports creation of consistent copies, across any number of devices, across any number of Symmetrixes, provided the source devices are in a state allowing creation of a consistent copy. To achieve this, EMCTF provides a sequence-level, as a sort of tag on each SPLIT command, and will attempt to create a consistent image across all devices with SPLIT commands at the same sequence level, when requested. TF/Mirror requires the target devices to have the legacy 'BCV' flag.

TF/Clone Mainframe SNAP facility—full space volume or dataset copies—TF/Clone allows copying any device to any device, and also allows the user to only copy one or more datasets from one volume to another, instead of copying the entire volume (SNAP DATASET). Furthermore, TF/Clone can make the target volume available immediately, before the data has been copied. TF/Clone provides the SNAP and ACTIVATE commands. ACTIVATE applies to all previous SNAP commands in the input stream, and can provide a consistent data copy under same circumstances as TF/Mirror.

TF/SnapVX—space efficient volume copies. TF/SnapVX was introduced with the VMAX3 generation of HW, and provides data copies called snapshots, which only take the place required to hold tracks updated on the source volumes since the time of activation of the snapshot. TF/SnapVX creates snapshots of the data, not requiring target devices at all. Data can be restored, straight from the snapshot back to the source device. Consistent snaps are supported. Up to 256 snapshots can be created from the same source device. Target devices, while not required, are supported, and up to 1024 target devices can be linked to the same source device. This can be 1024 targets linked to a single snapshot, or 4 targets for each of 256 snapshots, or anything in between.

TF/Utility—making local copies of your data available to z/OS—DELL EMC LREP technology creates copies for volumes, but to make the data on these copies fully useable on the system which is the source of the data, additional processing is required, and this is what TF/Utility does. TF/Utility makes data copies available in parallel to the source data on the same z/OS system. Users making complete copies of all data required for a system and its applications to run, can bring up another z/OS system from the copies, without the need for TF/Utility. TF/Utility is typically used by users of TF/Mirror and TF/Clone Mainframe Snap facility. With TimeFinder Utility, users can relabel devices with new volsers and update the catalogs by renaming and recataloging both VSAM and non-VSAM datasets. TimeFinder Utility enables users to perform the following operations in a production or simulation run: (1) assign a different volser to a device CUU; (2) m ass change the HLQs (high-level qualifiers) of datasets; and (3) recatalog the datasets to an existing or a new catalog zDP—z/OS Data Protector—a/k/a the "Time Machine" for mainframe. Data Protector for z Systems (zDP) delivers the capability to recover from logical data corruption with minimal data loss. zDP achieves this by providing multiple, frequent, consistent point-in-time copies of data in an automated fashion from which an application level recovery can be conducted, or the environment restored to a point prior to the logical corruption. By providing easy access to multiple different point-in-time copies of data (with a granularity of minutes), precise remediation of logical data corruption can be performed using application-based recovery procedures at the dataset level. zDP results in minimal data loss compared to the previous method of restoring data from daily or weekly backups. This is important for non-DBMS data, which does not have the granular recovery options provided by log files and image copies associated with database management systems. zDP enables users to create and manage multiple point-in-time snapshots of volumes. A snapshot is a pointer-based, point-in-time image of a single volume. These point-in-time copies are created using the SnapVX feature of HYPERMAX OS.

GDDR—Geographically Dispersed Disaster Recovery 130

Automation—GDDR 130 provides automation for real Disaster Recovery and Business Continuity requirements as well as DR-Test scenarios for VMAX (used both as DASD and as TAPE backend storage) as well as VNX and DD (used as TAPE backend storage), exploiting both local and remote replication features to achieve the highest data protection and availability. It provides monitoring of a user-defined configuration, and integration points with customer automation to speed up recovery.

Standardization and Customization—GDDR 130 is characterized as a highly standardized yet highly customizable solution. A single common code base brings a familiar look and feel and a consistent framework to the multiple configuration types it supports. A well-structured and standardized process to perform configuration definition enables highly dynamic configuration management. Configuration definition is further facilitated by automatic configuration discovery. GDDR 130 offers several screens full of options to control its behavior during scripts.

Configuration support—GDDR 130 Supports Mainframe (DASD and TAPE) as well as Distributed servers (DASD) in a single Enterprise Consistency group, in multiple variations of 2-Site, 3-site and 4-site configurations. It provides management capabilities for the local and remote replication and data consistency features provided by VMAX using a standardized EMC Symmetrix API as well as a command interface, but also for Mainframe LPARs using BCPii and for Mainframe Tape where VMAX serves as the backend storage, using the DLMDR interface. The integration with DLm allows coordinated planned and unplanned site swaps as well as DR-Testing for DASD and Tape at the same time. GDDR 130 supports all these configurations out of the box with all required scripts to perform unplanned as well as regular planned Site Swaps as well as SRDF resumption operations and both in-region and out-of-region DR testing.

LREP support—GDDR 130 supports TF/Mirror, TF/Clone and TF/SnapVX and provides seamless integration with zDP by ensuring that zDP operations are temporarily paused during GDDR 130 scripts at affected sites, thus avoiding creation of needless copies at times when the data does not change. zDP activity is automatically resumed by GDDR 130 at the end of affected scripts. GDDR 130 supports the creation of consistent images of the data across V1/V2 and V3 Symmetrix VMAX HW. GDDR 130 supports usage of a dedicated TEST-set of LREP targets, on top of a GOLD set used to preserve data consistency at a site during SRDF resynchronizations.

TAPE support—In GDDR 5.1 the common GDDR 130 code base has been enhanced to support an additional licensed feature called GDDR TAPE. GDDR TAPE brings the familiar GDDR automation framework to the Disaster Recovery of Mainframe TAPE data where VNX and/or Data Domain servers form the backend storage. Just like for VMAX, GDDR TAPE provides scripting for unplanned as well as planned site swaps and DR-Test scenarios. GDDR Tape allows operations with very fine granularity, as it can run scripts on subsets of the data, as small as a single Tape Library and even pools within Tape Libraries. GDDR TAPE is supported in 2-site configurations only. When combined with a GDDR (VMAX) license, coordinated VMAX-VNX/DD scripts are possible.

z/TPF z/TPF—The Transaction Processing Facility (z/TPF) system is an operating system that works with application programs to process transactions for customers in a real time environment. The z/TPF system is designed for businesses and organizations that have high online transaction volumes and large networks. Because of its high capacity and high availability characteristics, the z/TPF system is well suited for environments where growth is expected to be very fast or unpredictable, or where there are high peak periods of transaction activity. It is especially useful for applications that need high capacity and extremely low cost per transaction.

z/TPF is an extremely responsive solution to the problem of keeping track of a large number of transactions. Originally developed for the airline industry, it is also used for banking networks, credit card companies, railways, hotel chains, car rental agencies, insurance companies and police departments. The common link between the diverse applications is that they all require large numbers of terminals to be connected to a common database, and the response time to requests or commands to be "immediate".

The z/TPF system has the following advantages and characteristics: it may be accessed by tens of thousands of terminals, from many locations around the world, information is stored in a large centralized database that may be as large as tens of thousands of megabytes, the system is available 24 hours a day, every day of the year; the scheduled availability exceeds 99.9% and when z/TPF central processing complexes (CPC's) are run in a loosely coupled configuration even higher availability can be achieved, it is a real-time inquiry-response system with high message rates which means: "up to hundreds of messages per second; and for even higher throughput, a loosely coupled z/TPF system can process thousands of messages per second". To run in a loosely coupled environment the storage subsystem must support the Multi Processor Lock Facility (MPLF).

z/TPF Mainframe IO is performed thru the creation of a Channel Program, which is a series of one or more Channel Command Words (CCW), which is executed using a STARTIO (low-level) or Execute Channel Program (EXCP, higher level) instruction.

SymmAPI for z/TPF—The SYSCALL layer is implemented by attaching a syscall specific payload to one of a few special CCWs (e.g. Perform Subsystem Function and Define Special Operation).

SRDF Controls for z/TPF—Is used to configure, display, and manage your remote replication (SRDF) configurations. It provides a wide array of display types, showing detailed device-type and device-attribute information, as well as RDFGroup level and Symmetrix level information. It allows the user to control synchronous, asynchronous and adaptive copy disk remote replication, with extensive command validation, both from the syntax and the object status perspective. SRDF Controls for z/TPF is also used to configure, display, and manage Multi-Session-Consistency (MSC) groups. Please see descriptions of z/OS MFE level features for information about MSC.

TimeFinder Controls for z/TPF—Is used to configure, display, and manage your local replication (TimeFinder) configurations. It provides a wide array of display types, showing detailed device-type and device-attribute information, as well Symmetrix level information. It allows the user to control TimeFinder/Mirror Emulation, TimeFinder/Clone Emulation, SnapVX, and zDP groups. Please see descriptions of z/OS MFE level features for information about these various local replication features.

ResourcePak for z/TPF—Provides various utilities and features (E.G. QoS, Cache Partitioning, MPLF Lock and Attention Message Display) that can be used separately or in conjunction with SRDF and TimeFinder Controls for z/TPF.

Offline Module Access (OMA) provides a customer API for the customer to develop utilities to display and/or restore individual records from a clone or linked snapshot to the production z/TPF database.

DL/m virtual tape utilities provide a suite of functionality required to use DL/m in a z/TPF environment.

Console Automation—Customers typically develop Console Automation using scripted procedures and processes provided by z/TPF Engineering. This console automation is the highest level of software used to manage SRDF and TimeFinder Groups for a z/TPF Disaster Recovery solution.

Figure 2:
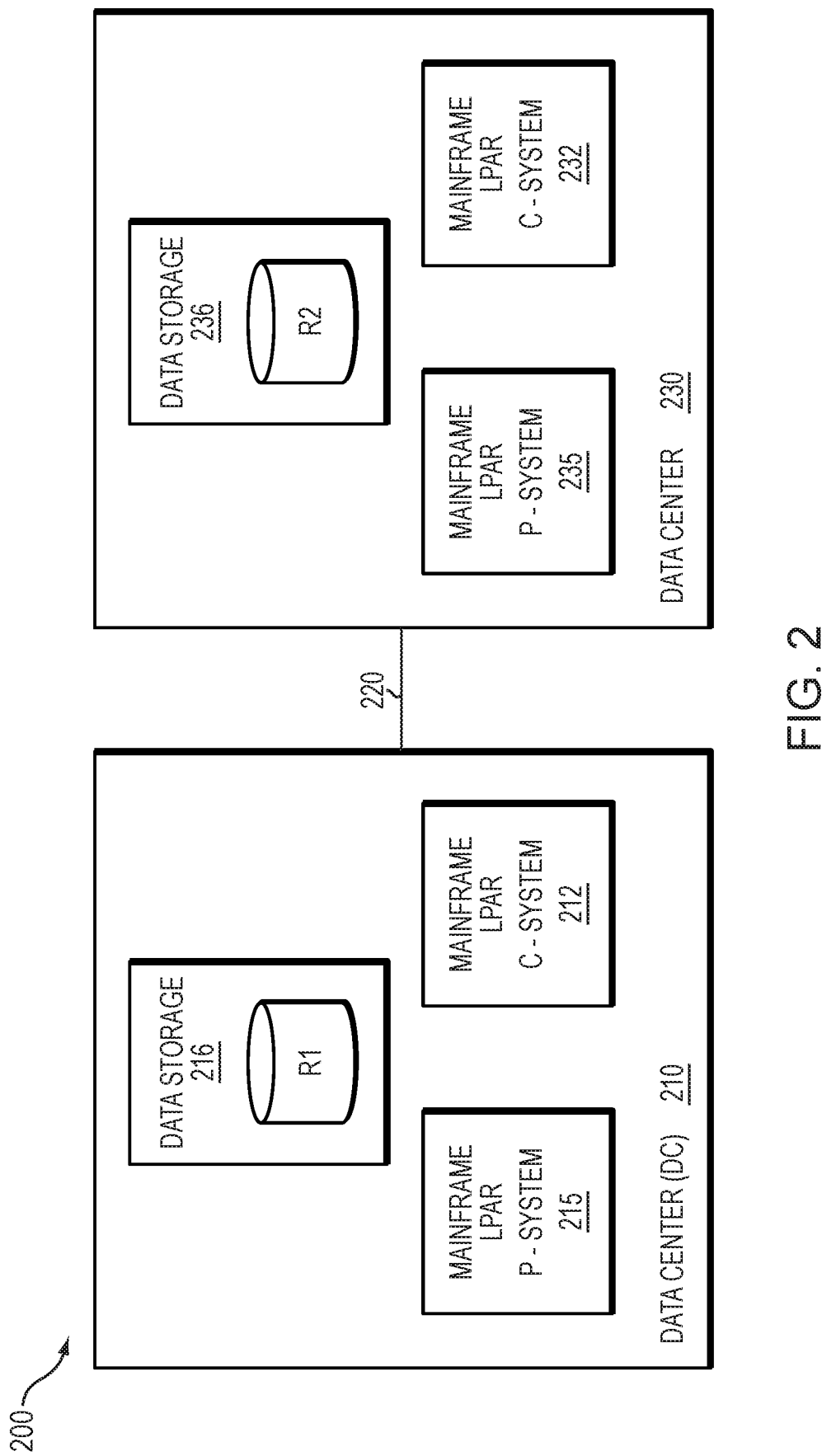
FIG. 2 is a functional block diagram of an exemplary data recovery system for providing data redundancy between two disparately located data centers.

FIG. 2 shows exemplary architecture for a two-site data recovery system 200. This two-site data recovery system 200 comprises, a first data center 210, which is also referred to as a primary data center, having a control system ("C-system") 212, a production system 215, and a data storage device 217. Similarly, the secondary data center 230, also contains a control system ("C-system") 232, a production system 235, and a data storage device 237. By way of example, and without limitation, the two-site data recovery system could be a GDDR mainframe system operating on an IBM mainframe platform. While embodiments herein will be discussed with reference to GDDR architecture running on IBM mainframes, those of skill in the art will recognize that the systems and methods disclosed herein could also be implemented on other data/disaster recovery architectures operating on different mainframe platforms.

The first 210 and second data centers 230 are communicatively coupled via communication link 220. Communication link 220 can provide both synchronous, SRDF/S, and asynchronous, SRDF/A, data redundancy between first data center 110 and second data center 230. FIG. 2B depicts a synchronous data connection between data centers 210 and 230. In typical embodiments, synchronous connections are used when data centers 210, 230 are located within close proximity to one another. Exemplary synchronous topologies could have data centers 210, 230 within the same building. Typical entities seeking to deploy synchronous data centers 210, 230 may be financial institutions and the like who must ensure that a check deposit recorded at data center 210 appears as a full check deposit, having all of the same information, at data center 230.

With reference to FIG. 2, in some situations, it would be advantageous to partition one or more LAPRs. For example, the LPAR running C-system 212 could be partitioned into multiple partitions so long as messages intended for C-system 212 were received and responded to within C-system 212. Equally important, if the LPAR upon which C-system is operating was partitioned to allow additional address spaces to be created to tasks other than those associated with C-System 212, we would want to ensure that C-system 212 did not react to messages generated form or intended for these additional tasks. We achieve this functionality through message affinity. Message affinity improves computer functionality by allowing more than one instance of GDDR or mainframe enabled tasks to coexist on a single logical partition.

By way of background, Dell EMC's GDDR product is an automation tool that can be used to manage the disaster recovery portion of a geographically dispersed disaster restart system. Referring to FIG. 1, mainframe enablers 120 are used to manage VMAX-type systems deployed in a disaster recovery or data redundancy scenario. GDDR 130 is an automation tool that can be used in conjunction with MFE 120. GDDR 130 automates the disaster recovery steps in the event of a disaster. Of note, not all geographically dispersed data systems require the automation piece we refer to as GDDR 130. When we use the term "GDDR" in this specification with regard to embodiments described herein, we are referring to the automation tool that can be used in conjunction with mainframe enablers 120.

Figure 3:
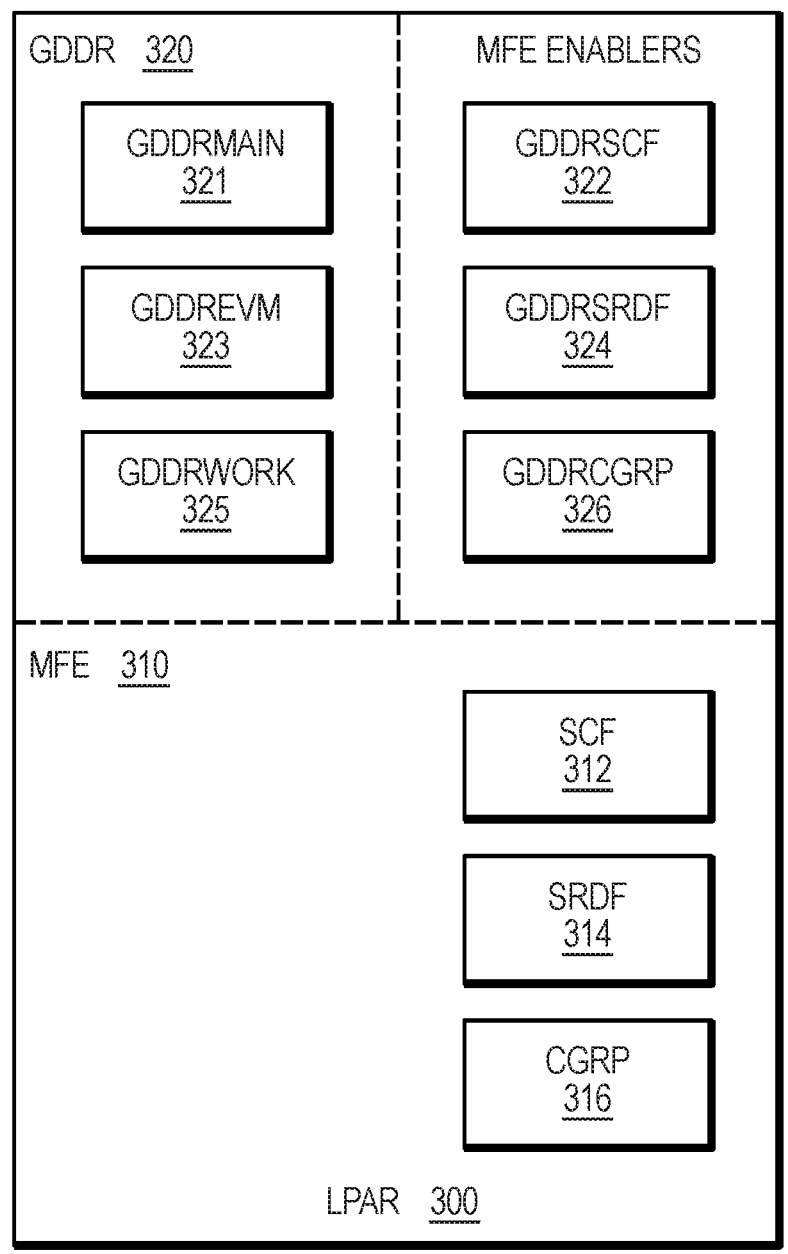
FIG. 3 is a functional block diagram of an exemplary topology of a mainframe partitioned to allow coexistence of a GDDR system and a set of main frame enabler tasks according to embodiments herein.

In order to illustrate how message affinity works, we discuss two architectural scenarios within which message affinity could be used. FIG. 3 illustrates a first architectural scenario wherein a mainframe, interchangeably called a logical partition throughout 300, could be partitioned to allow coexistence of a GDDR instance 320 and mainframe enabler tasks 310. In this example topology, we have an allocated address space for GDDRMAIN 321 and its dependent address spaces, GDDREVM 323 and GDDRWORK 325. The GDDR instance 320 also includes its mainframe enablers GDDRSCF 322, GDDRSRDF 324, and GDDRCGRP 326. Together, this group of address spaces comprises a single GDDR instance 320.

Traditionally, GDDR instances have been housed on separate mainframes because it is imperative, in a disaster recovery system or other automated system, to prevent GDDR instances from reacting to messages issued by any Mainframe Enablers started task running outside of its GDDR-managed configuration. With message affinity, we are able to add mainframe enabled tasks 310, specifically SCF 312, SRDF 314, and CGRP 316 to the same mainframe LPAR as that of GDDR instance 320. Without message affinity, GDDRMAIN 321 and its dependent address spaces 323, 325 would react to message issued by both its mainframe enablers GDDRSCF 322, GDDRSRDF 324, and GDDRCGRP 326 as well as messages issued by foreign mainframe enablers SCF 312, SRDF 314, and CGRP 316.

Multitenancy of GDDR instances is a second example of am architectural configuration that would benefit by using message affinity. The term "multitenancy" refers to running multiple GDDR instances on a single control system ("C-system"), each referred to as a C-instance. A managed system, or production system ("P-system"), may only have one active GDDR instance. A C-instance 320 consists of a single GDDRMAIN 321 address space and its dependent address spaces (e.g., GDDREVM 323, GDDRWORK 325, GDDR scripts) running on a given z/OS system 300. Each C-instance 320 has a dedicated set of Mainframe Enablers (MFE) started tasks (e.g., SCF 322, SRDF Host Component 324, ConGroup 326). The combination of a C-instance and its set of MFE started tasks is known as an affinity group.

A set of C-instances and their managed P-systems connected via TCP/IP is known as a GDDR complex (a.k.a. GDDR-plex). One GDDR-plex manages a single set of consistent data, or for GDDR Tape a single tape profile dataset, and each GDDR-plex uses its own dedicated TCP/IP port. Different C-instances running on a single C-system are completely disjoint. That is, different GDDR-plexes operate completely independent of each other. C-instances cannot share MFE address spaces, and a single C-instance cannot be part of multiple GDDR-plexes. Each C-instance operates exclusively within its own set of address spaces. That is, a particular C-instance will not react to messages nor reply to WTORs issued by an address space outside of its affinity group. Likewise, each GDDR-plex operates exclusively within its own set of GDDR instances. Messages are never forwarded to a C-instance or P-system outside of a given GDDR-plex. GDDR multitenancy allows multiple GDDR-plexes managing different storage configurations to share the same set of C-systems, decreasing the number of mainframe LPARs that must be dedicated to GDDR and therefore reducing hardware costs for the customer.

Figure 4:
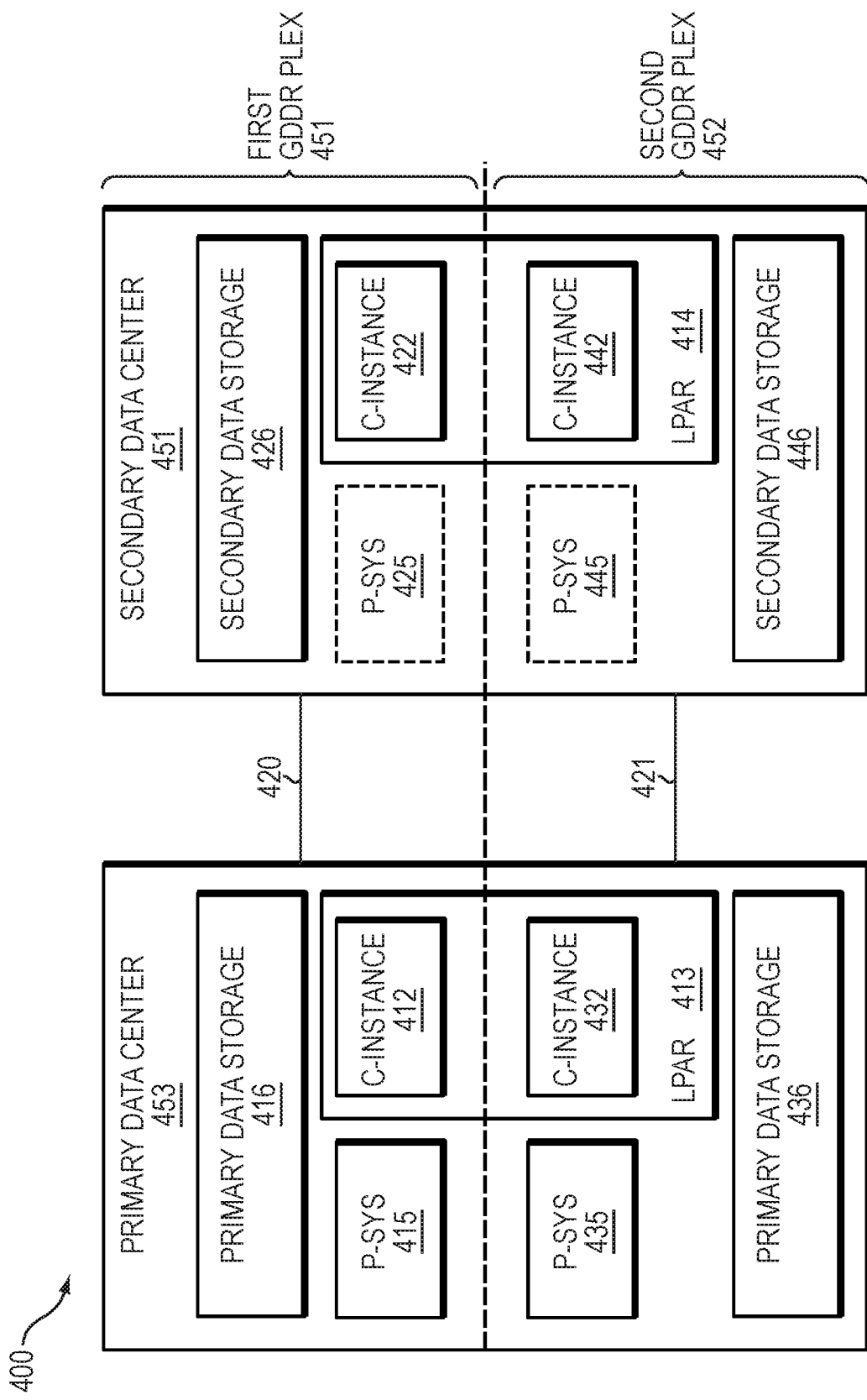
FIG. 4 is a functional block diagram of a geographically dispersed disaster restart ("GDDR") multitenancy system according, which could be used with embodiments herein.

FIG. 4 shows a geographically dispersed disaster restart multitenancy system 400. For simplicity, the GDDR multitenancy system is depicted and discussed using two 2-site GDDR complexes. Those of skill in the art will recognize that the teachings, systems, methods, devices, etc. disclosed herein could also be implemented on larger GDDR complexes having varied topologies. Additionally, and with respect to claim language, the claimed embodiments could be implemented with any number of primary, secondary, tertiary, quaternary and more control instances being combined into a single LPAR. While we discuss embodiments in the context of primary and secondary, for clarity in terms of numbering, those of skill in the art will recognize that some GDDR topologies could be referred to as having a primary site and a tertiary site, without having a secondary site. In this topology, the term "tertiary" would be equivalent to the term "secondary" as used in this specification and in the claims.

The GDDR multitenancy system 400 of comprises a first GDDR complex 451 and a second GDDR complex 452. The first GDDR complex 451 has a first primary data storage device 416, and a first secondary data storage device 426. The first primary data storage device 416 and the first secondary data storage device 426 are geographically separated from one another. In embodiments, the amount of geographic separation can vary. The first GDDR complex 451 further comprises a first primary production system 415. In alternate embodiments, the first primary production system 425 could be located at the secondary data center 451. In yet alternate embodiments, the first GDDR complex 451 could have two or more production systems 415, 425. In yet additional embodiments, the first GDDR complex 451 could have no production systems 415, 425.

The primary data center 453 is communicatively coupled to the secondary data center 454 via at least one communication link 420, 421. Communication links 420, 421 support synchronous or asynchronous communication. The first GDDR complex 451 also includes a first primary control instance 412 and a first secondary control instance 422.

Similarly, the second GDDR complex 452 has a second primary data storage device 436, and a second secondary data storage device 446. The second primary data storage device 426 and the second secondary data storage device 446 are geographically separated from one another. In embodiments, the amount geographic separation can vary. The second GDDR complex 452 further comprises a second primary production system 435. In alternate embodiments, the second primary production system 445 could be located at the secondary data center 451. In yet alternate embodiments, the second GDDR complex 452 could have two or more production systems 435, 445. In yet alternate embodiments, the second GDDR complex 452 could have no production systems 435, 445.

The second GDDR complex 452 also includes a second primary control instance 432 and a second secondary control instance 422. In embodiments, the first primary control instance 412 and the second primary control instance 432 are located on a single LPAR 413. In this embodiment, computer functionality has been improved by reducing the number of required mainframes by one. In alternate embodiments, the first secondary control instance 422 and the second secondary control instance 442 are also located on a single LPAR 414. In this embodiment, computer functionality has been improved by reducing the total number of mainframes by two.

In some embodiments one or more data storage device 416, 426, 436, 446 could be a Dell EMC VMAX. As was discussed earlier, the data within data storage devices 416, 426, 436, 446 sharing the same GDDR complex should be redundant, or nearly redundant in the case of asynchronous connections.

Those of skill in the art will recognize that alternate embodiments could include alternate topologies, such as STAR configurations. Additionally, more GDDR complexes could be added to the network in additional embodiments. In these additional embodiments having more GDDR complexes, additional C-instances could be added to one of the single logical partitions 413, 414. Each time a control instance is added to a single LPAR, computer functionality is improved by reducing the number of necessary mainframes required for the GDDR multitenancy system 400 by one.

The embodiments disclosed herein could be employed on a GDDR VMAX. In these embodiments, each GDDR complex could manage a single set of consistent data using a dedicated C-system. In alternate embodiments, the teachings disclosed herein could be used in conjunction with a Dell EMC GDDR Tape product. In these embodiments, each GDDR complex could manage a single tape profile. In GDDR Tape configurations, a managed system may have a C-system role, and in that case the system does not support Multi-Tenancy. In alternate embodiments, the teachings disclosed herein could be used with GDDR VMAX and GDDR Tape.

Without losing the general applicability of embodiments described thus far, we now discuss implementation details for embodiments using Dell EMC products. Two of the main functions of a GDDR C-System are to control data recovery after an outage; and to automate a planned site swap.

Support for multiple C-instances on the same C-system is largely made possible by message affinity. Message affinity enables GDDR Multi-Tenancy, which allows multiple GDDR-plexes managing different storage configurations to share the same set of C-systems, decreasing the number of mainframe LPARs that must be dedicated to GDDR and therefore reducing hardware costs for the customer.

With the introduction of GDDR Multi-Tenancy, GDDR will now support running multiple GDDR instances on a single z/OS system. A GDDR-instance, which could be a C-instance or a P-instance, consists of a single GDDRMAIN address space and its dependent address spaces (e.g., GDDREVM, GDDRWORK, and GDDR scripts) running on a given z/OS system. Each GDDR-instance has a dedicated set of Mainframe Enablers (MFE) started tasks (e.g., SCF, SRDF Host Component, and ConGroup). The combination of a GDDR-instance and its set of MFE started tasks are known as an affinity group. A set of C-instances and their managed production systems (a.k.a. P-systems) connected via TCP/IP is known as a GDDR complex (a.k.a. GDDR-plex). Each GDDR-plex manages its own set of consistent data, or for GDDR Tape its own tape profile dataset. Therefore, different GDDR-plexes must operate completely independent of each other. This means that different GDDR-instances running on a single z/OS system must be completely disjoint. Each GDDR-instance must operate exclusively within its own set of address spaces. That is, a particular GDDR-instance must not react to messages nor reply to WTORs issued by an address space outside of its affinity group. This is made possible by a mechanism we call Message Affinity.

Each GDDR-instance must have a unique GDDR subsystem name. This is specified using a GDD$xxxx DD DUMMY statement in the job control language (JCL), with xxxx being the GDDR subsystem name. We call this the GDDR connector. If none is specified, GDD$GDDR DD DUMMY is assumed. If a GDDR subsystem name is already in use by another active GDDR-instance, GDDRMAIN will fail to start. Likewise, each C-instance must have a unique SCF subsystem name. This is specified using an SCF$xxxx DD DUMMY statement in the JCL, with xxxx being the SCF subsystem name. We call this the SCF connector. If none is specified, SCF$EMC DD DUMMY is assumed. If an SCF subsystem name is already in use by another active C-instance, GDDRMAIN will fail to start.

Specification of an SCF connector is limited to the GDDRMAIN started task JCL, as well as in all MFE started tasks (e.g., SCF, SRDF Host Component, and ConGroup), and in certain batch utilities that interface with SCF. The SCF connector is what ties a GDDR-instance to a set of MFE started tasks as well as what ties the MFE started tasks together. Each GDDR-instance must have its own dedicated set of MFE started tasks, all with the same SCF connector.

A GDDR connector need only be specified in the GDDR-MAIN JCL and in certain batch utilities that interface with GDDR. The GDDR connector is what ties GDDR address spaces together. For dependent address spaces (e.g., GDDREVM, GDDRWORK, and GDDR scripts), the GDDR and SCF connectors are allocated dynamically and should not be specified in the JCL. GDDR and SCF connector DDs should not be specified in TSO logon procs, as they are also dynamically allocated by the GDDR ISPF interface.

Each GDDR instance monitors all message traffic on that given system using an extended MCS (Multiple Console Support) console, which runs as a subtask in the GDDR-MAIN address space known as the MCSOPER subtask. With the introduction of GDDR Multi-Tenancy, more than one GDDR instance can now run on a single z/OS system, so we cannot just assume that every message has affinity with our instance. When a message is intercepted, the MCSOPER subtask receives an MDB (Message Data Block) for that message. This MDB contains various information about the intercepted message, including the message ID as well as the message issuer's ASID (Address Space ID), job step TCB (Task Control Block) address, job name, and job ID. The MSCOPER subtask then attaches a copy of the MDB to a WCB (Work Control Block). This WCB is sent to the console message worker, also a subtask in the GDDR-MAIN address space, for processing. Once in the console message worker, if message automation is not enabled for that message ID, the message is ignored. If message automation is enabled for that message ID, if the message originated on the local system, and if affinity checking is required, then the console message worker schedules an SRB (Service Request Block) to run in the message issuer's address space. The SRB is passed a data area residing in the GDDRMAIN address space containing the message issuer's ASID, job step TCB address, job name, and job ID. The SRB validates this information against the ASCB (Address Space Control Block), TIOT (Task Input/Output Table), and SSIB (Subsystem Information Block), to ensure we have correctly located the message issuer. The SRB then analyzes the TIOT for a GDDR and/or SCF connector and populates the associated GDDR and/or SCF subsystem names in the passed data area using access register mode. Upon return of control to the console message worker, the returned GDDR and/or SCF subsystem names are compared with those in use by our GDDR instance. If it is determined that the message has affinity with our GDDR instance (or if affinity checking was not required), the message is processed or forwarded, as indicated in the GDDR message intercept table. Otherwise, the message is ignored. GDDR messages have affinity with our GDDR instance only if the issuer's GDDR connector matches ours. Likewise, MFE messages have affinity with our GDDR instance only if the issuer's SCF connector matches ours. Non-EMC messages are not subject to affinity checking. In addition, messages forwarded from remote systems or issued on another system in the same system complex (sysplex) are not subject to affinity checking, as affinity is verified on the local system.

Message affinity checking helps keep different GDDR-plexes fully isolated from each other and prevents a GDDR instance from reacting to a message that doesn't belong to it, either by processing it locally or by forwarding it to another system in the GDDR-plex to be processed there. It also prevents a GDDR instance from reacting to messages issued by any MFE started tasks running outside of a GDDR-managed configuration altogether.

Figure 5:
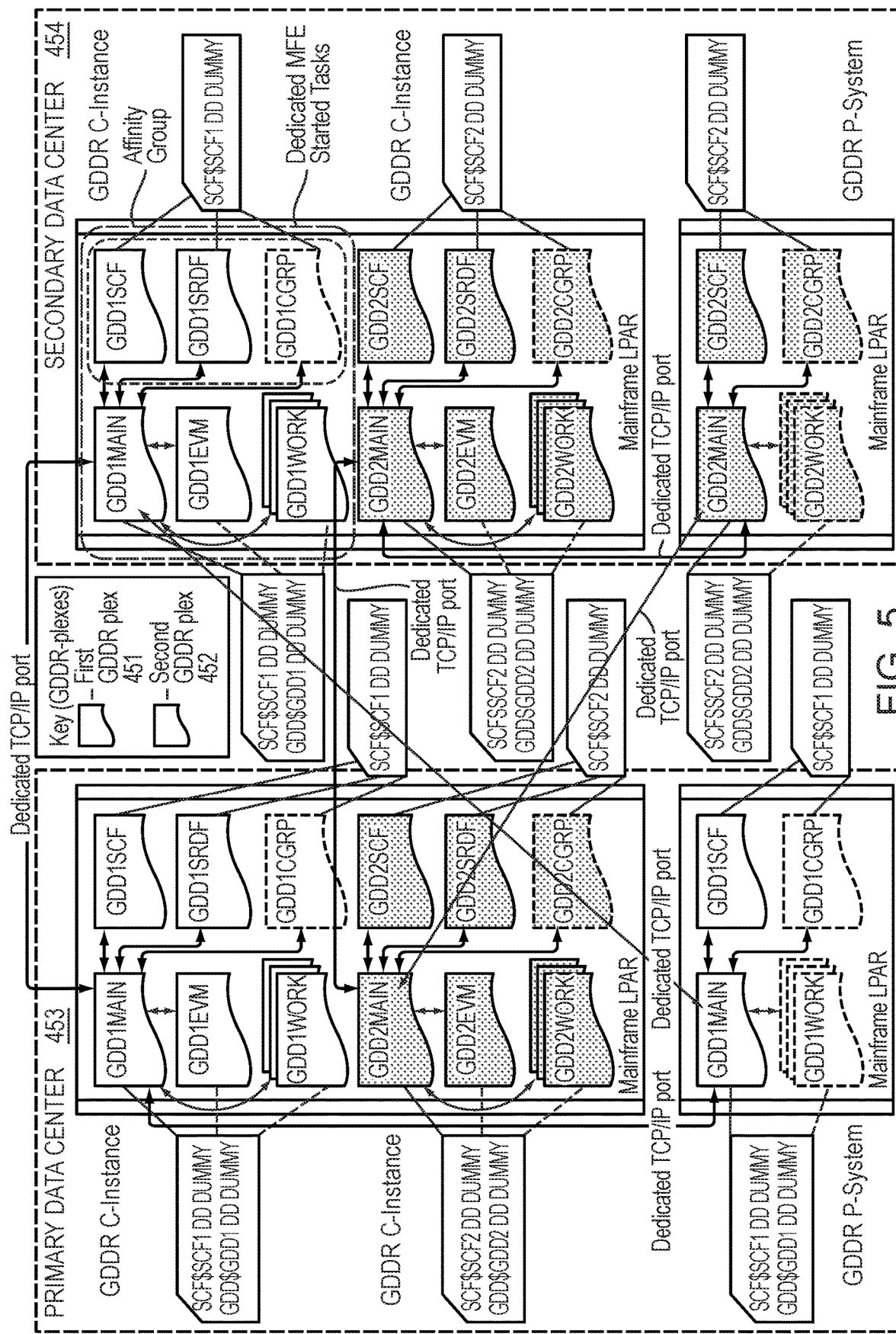
FIG. 5 is functional block diagram of two GDDR complexes sharing the same set of C-systems employing message affinity.

FIG. 5 is an example of a first GDDR complex 451 and a second GDDR complex 452 sharing the same set of C-systems. FIG. 5 illustrates how methods disclosed herein isolate tasks and messages being exchanged between the two GDDR complexes 451, 452.

Figure 6:
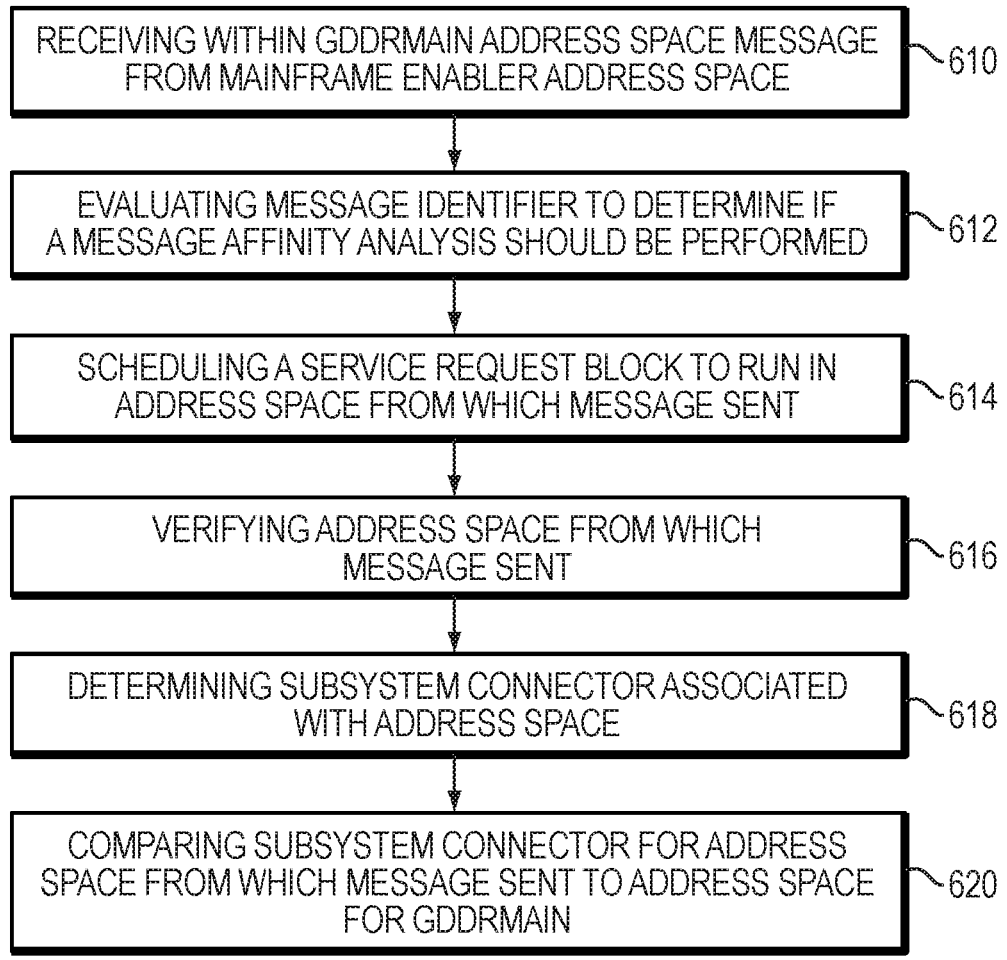
FIG. 6 is a flow chart of method steps according to embodiments disclosed herein.

We explain Message Affinity with reference to FIGS. 1, 5 and 6. Referring first to FIG. 1, we show a software stack diagram showing integration points between Dell EMC mainframe software for z/OS 110 and z/TPF 111 operating systems. Symmetrix Control Facility 112 is an API used to communicate with or manage a Symmetrix, or VMAX. Symmetrix Remote Data Facility 122 ("SRDF") is part of the Mainframe Enablers 120. SRFD 122 provides replication commands, which create pairings for devices within a GDDR complex. Consistency group (con group) 124 provides consistency among devices to facilitate synchronous and asynchronous replication.

Referring to FIG. 5, we show a first GDDR complex and a second GDDR complex, each having a GDDR C-instance and a GDDR P-system in primary data center 453 and secondary data center 454. The C-instances and P-systems in primary 453 and secondary 454 data centers contain similarly named address spaces, some of which are native to the GDDR software stack 130. Specifically, GDDxMAIN, GDDxEVM, GDDxWORK are GDDR 130 address spaces, while GDDxSCF, GDDxSRDF, and GDDxCGRP are Mainframe Enablers address spaces 120. The message affinity embodiments described herein can be used in either a C-instance or a P-system.

The need for message affinity arises from the fact that more than one GDDR-complex, which can be comprised of a C-instance, a P-system, or both, is collocated on a single mainframe, interchangeable called a mainframe or a logical partition ("LPAR") throughout. Stated simply, message traffic between the multiple GDDR-complexes must remain segregated. In FIG. 5, we show two GDDR-complexes collocated on a single LPAR, namely primary data center 453 and secondary data center 454. In alternate embodiments, there could be more than two GDDR-complexes located on a single LPAR. In a preferred embodiment using synchronous GDDR configurations, there could be as many as eight GDDR-complexes on a single LPAR. That number increases for asynchronous configurations.

In order to illustrate the teachings of message affinity embodiments, we refer to FIG. 6, which depicts method steps for enabling a geographically dispersed disaster recovery control system having a subsystem connector associated therewith and being a part of an affinity group to coexist on a mainframe with an address space having a different affinity group using message affinity. FIG. 6 shows the steps in method embodiments for enabling a geographically dispersed disaster recovery ("GDDR") control system having a subsystem connector associated therewith and being a part of an affinity group to coexist on a mainframe with an address space outside of the affinity group. According to method embodiments, the GDDRMAIN address space intercepts 610 a message from a mainframe enabler address space, the message comprising a message identifier and a plurality of message characteristics. Within the GDDR-MAIN address space, method embodiments evaluate 612 the message identifier to determine if a message affinity analysis should be performed. From there, GDDRMAIN schedules 614 a service request block to run in an address space from which the message was issued. Once the service request block is run in the address space from which the message was issued, that address space uses its processing power to verify 616 that the message was in fact sent from its address space. The verification 616 process, in embodiments could be comprised of analyzing the message issuer's ASID, job step TCB address, job name, and/or job ID. The service request block could validate this information using an ASCB ("Address Space Control Block"), a task input/output table ("TIOT"), and a subsystem information block ("SSIB"), to ensure we have correctly located the message issuer. The ASCB, TIOT, and SSIB are control blocks stored in memory on the local logical partition.

Next, the service request block could determine 618 a subsystem connector for the message being analyzed. In order to determine 618 a subsystem connector, the service request block could analyze the TIOT in order to find a subsystem connector, which in embodiments could be a GDDR connector and/or an SCF connector. The service request block could then populate the associated subsystem connector name in the passed data area using an access register mode.

Upon return of control to the console message worker in GDDRMAIN, the returned subsystem connector names, which in some embodiments can be a GDDR connector and/or an SCF connector are compared 620 with those in use by the GDDR instance associated with GDDRMAIN. If it is determined that the message has affinity with our GDDR instance (or if affinity checking was not required), the message is processed or forwarded, as indicated in the GDDR message intercept table. Otherwise, the message is ignored. GDDR messages have affinity with our GDDR instance only if the issuer's GDDR connector matches ours. Likewise, MFE messages have affinity with our GDDR instance only if the issuer's SCF connector matches ours.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for enabling a geographically dispersed disaster recovery ("GDDR") control system or a managed production system having a subsystem connector associated therewith and being a part of an affinity group to coexist on a mainframe, the mainframe having a Mainframe Enablers address space outside of the affinity group comprising the steps of:
   a. receiving within a main address space for the GDDR ("GDDRMAIN") a message from the Mainframe Enablers address space, the message comprising a message identifier and a plurality of message characteristics;
   b. evaluating the message identifier to determine if whether or not a message affinity analysis should be performed;
   c. scheduling a service request block to run in an address space from which the message was sent;
   d. verifying the address space from which the message was sent;
   e. determining a subsystem connector associated with the address space from which the message was sent; and
   f. comparing the subsystem connector associated with the address space from which the message was sent to the subsystem connector for the GDDRMAIN address space.

2. The method of claim 1, wherein the subsystem connector is a GDDR connector or an SCF connector.

3. The method of claim 1, wherein the subsystem connectors are a dummy data definition in the job control language.

4. The method of claim 1, wherein the mainframe is a logical partition.

5. The method of claim 1, wherein the affinity group is the control system or a managed production system having a subsystem connector associated therewith and one or more Mainframe Enablers address spaces having the same subsystem connector associated therewith.

6. The method of claim 1, wherein the plurality of message characteristics is at least one of a message issuers address space identifier, job step task control block address, a job name, or a job identifier.

7. The method of claim 1, wherein the GDDRMAIN address space is also an address space belonging to another automation product.

8. The method of claim 1, wherein one or more of the Mainframe Enablers address spaces are also alternative address spaces of interest to the GDDR system or to another automation product.

9. A computer program product for enabling a geographically dispersed disaster recovery ("GDDR") control system or a managed production system having a subsystem connector associated therewith and being a part of an affinity group to coexist on a mainframe, the mainframe having a Mainframe Enablers address space outside of the affinity group, the computer program product being embodied in a tangible, non-transitory computer readable storage medium and comprising computer instructions for:
   a. receiving within a main address space for the GDDR ("GDDRMAIN") a message from the Mainframe Enablers address space, the message comprising a message identifier and a plurality of message characteristics;
   b. evaluating the message identifier to determine if whether or not a message affinity analysis should be performed;
   c. scheduling a service request block to run in an address space from which the message was sent;
   d. verifying the address space from which the message was sent;
   e. determining a subsystem connector associated with the address space from which the message was sent; and
   f. comparing the subsystem connector associated with the address space from which the message was sent to the subsystem connector for the GDDRMAIN address space.

10. The computer program product of claim 9, wherein the subsystem connector is a GDDR connector or an SCF connector.

11. The computer program product of claim 9, wherein the subsystem connectors are a dummy data definition in the job control language.

12. The computer program product of claim 9, wherein the mainframe is a logical partition.

13. The computer program product of claim 9, wherein the affinity group is the control system or a managed production system having a subsystem connector associated therewith and a Mainframe Enablers address space having the same subsystem connector associated therewith.

14. The computer program product of claim 9, wherein the plurality of message characteristics is at least one of a message issuers address space identifier, job step task control block address, a job name, or a job identifier.

15. A system having a memory partitioned into a plurality of address spaces, the system enabling a geographically dispersed disaster recovery ("GDDR") control system having a subsystem connector associated therewith and being a part of an affinity group to coexist on a mainframe, the mainframe having a Mainframe Enablers address space outside of the affinity group comprising computer executable code for performing the steps of:
   a. receiving within a main address space for the GDDR ("GDDRMAIN") a message from the Mainframe Enablers address space, the message comprising a message identifier and a plurality of message characteristics;
   b. evaluating the message identifier to determine if whether or not a message affinity analysis should be performed;
   c. scheduling a service request block to run in an address space from which the message was sent;
   d. verifying the address space from which the message was sent;
   e. determining a subsystem connector associated with the address space; and
   f. comparing the subsystem connector associated with the address space from which the message was sent to the subsystem connector for the GDDRMAIN address space.

16. The system of claim 15, wherein the subsystem connector is a GDDR connector or an SCF connector.

17. The system of claim 15, wherein the subsystem connectors are a dummy data definition in the job control language.

18. The system of claim 15, wherein the mainframe is a logical partition.

19. The system of claim 15, wherein the affinity group is the control system or a managed production system having a subsystem connector associated therewith and a Mainframe Enablers address space having the same subsystem connector associated therewith.

20. The system of claim 15, wherein the plurality of message characteristics is at least one of a message issuers address space identifier, job step task control block address, a job name, or a job identifier.

* * * * *